(12) United States Patent
Mun et al.

(10) Patent No.: US 9,923,343 B2
(45) Date of Patent: Mar. 20, 2018

(54) DISTRIBUTION PANEL

(71) Applicant: LSIS CO., LTD., Anyang-si, Gyeonggi-do (KR)

(72) Inventors: Seunghwan Mun, Anyang-si (KR); Jongdoo Kim, Anyang-si (KR); Kilyoung Ahn, Anyang-si (KR); Seungpil Yang, Anyang-si (KR); Daesoo Han, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/276,651

(22) Filed: Sep. 26, 2016

(65) Prior Publication Data

US 2017/0194772 A1    Jul. 6, 2017

(30) Foreign Application Priority Data

Dec. 30, 2015 (KR) ........................ 10-2015-0189718

(51) Int. Cl.
*H02B 13/025* (2006.01)
*H02B 1/30* (2006.01)
*H02B 1/06* (2006.01)

(52) U.S. Cl.
CPC ............. *H02B 1/306* (2013.01); *H02B 1/066* (2013.01); *H02B 1/30* (2013.01); *H02B 13/025* (2013.01)

(58) Field of Classification Search
CPC ........ H02B 13/025; H02B 1/36; H02B 11/24; H02B 11/133; H02B 1/56; H02B 1/28;
(Continued)

(56) References Cited

U.S. PATENT DOCUMENTS 5,574,624 A * 11/1996 Rennie ..................... H02B 1/56
200/289
5,689,097 A * 11/1997 Aufermann ............ H02B 1/565
218/157
(Continued)

FOREIGN PATENT DOCUMENTS

EP         2846426       3/2015
JP         52067739      6/1977
(Continued)

OTHER PUBLICATIONS

European Patent Office Application Serial No. 16189456.3, Search Report dated Apr. 5, 2017, 7 pages.
(Continued)

*Primary Examiner* — Adam B Dravininkas
(74) *Attorney, Agent, or Firm* — K&L Gates LLP

(57) ABSTRACT

A distribution panel includes a cabinet having a space formed therein and an inner partition positioned within the cabinet and partitioning a front power transformer (PT) chamber and a rear cable chamber, wherein the inner partition includes: a partition body, on which a bushing is disposed in a penetrating manner, having openings allowing an arc to pass therethrough; and an inner cover rotatably coupled to the partition body to open and close the opening, and rotated by an arc pressure when an arc accident occurs in the front PT chamber, to open the opening. Since an arc from the front PT chamber is spread to the rear cable chamber, pressure of the front PT chamber may be lowered, and a phenomenon in which a PT door is forcibly opened at a high speed is minimized, minimizing an accident.

6 Claims, 7 Drawing Sheets

(58) Field of Classification Search
CPC .......... H02B 1/306; H02B 1/066; H02B 1/30; H02H 1/0023; H02H 1/0015; H02H 3/04; H02H 3/044; H05K 5/0239; H05K 5/0208

See application file for complete search history.

(56) References Cited

U.S. PATENT DOCUMENTS

| | | | | |
|---|---|---|---|---|
| 6,407,331 | B1* | 6/2002 | Smith | H02B 13/025 |
| | | | | 174/17 VA |
| 6,417,443 | B1* | 7/2002 | Smith | H02B 1/565 |
| | | | | 174/17 VA |
| 2003/0116413 | A1* | 6/2003 | Narusevicius | H01H 9/104 |
| | | | | 200/50.21 |
| 2004/0240160 | A1* | 12/2004 | Mahn | H02B 13/025 |
| | | | | 361/676 |
| 2009/0141432 | A1* | 6/2009 | Kingston | H02B 13/025 |
| | | | | 361/676 |
| 2009/0185333 | A1* | 7/2009 | Coomer | H02B 13/025 |
| | | | | 361/622 |
| 2012/0216393 | A1* | 8/2012 | Ballard | H01F 27/02 |
| | | | | 29/602.1 |
| 2013/0314827 | A1* | 11/2013 | Sohn | H01H 71/125 |
| | | | | 361/57 |
| 2015/0163957 | A1* | 6/2015 | Martinez-Cruz | H02B 1/565 |
| | | | | 454/184 |

FOREIGN PATENT DOCUMENTS

| | | |
|---|---|---|
| JP | 3664845 | 6/2005 |
| KR | 101079984 | 11/2011 |
| KR | 101297551 | 8/2013 |
| KR | 101581350 | 12/2015 |
| KR | 101588255 | 2/2016 |

OTHER PUBLICATIONS

Korean Intellectual Property Office Application No. 10-2015-0189718, Notice of Allowance dated May 15, 2017, 28 pages.
Search Report dated Apr. 25, 2016 prepared by Intellectual Property Solutions Corp., 9 pages.

\* cited by examiner

DISTRIBUTION PANEL

CROSS-REFERENCE TO RELATED APPLICATION

Pursuant to 35 U.S.C. § 119(a), this application claims the benefit of earlier filing date and right of priority to Korean Patent Application No. 10-2015-0189718, filed on Dec. 30, 2015, the contents of which are all hereby incorporated by reference herein in its entirety.

BACKGROUND OF THE INVENTION

1. Field of the Invention

The present disclosure relates to a distribution panel, and particularly, to a distribution panel having a partition partitioning an electric transformer chamber and a cable chamber.

2. Background of the Invention

A distribution panel is a facility receiving electric power and supplying electric power to a load facility installed in each power consumer.

The distribution panel may monitor, control and protect an electric power system, and various electric devices such as a circuit breaker (CB), a current transformer (CT), a power transformer (PT), and the like, are accommodated in the distribution panel and used.

In the distribution panel, a CB, a CT, a PT, and the like, may be accommodated and installed within a cabinet, and a PT chamber accommodating a PT may be separately formed in the distribution panel. The distribution panel may include a PT door for opening and closing the PT chamber, and by opening the PT door, a PT may be installed, repaired or tested.

When the distribution panel is operated, an arc accident may occur in the PT chamber in which the PT is accommodated, and in the event of the arc accident, the PT door may be pushed by pressure of an arc so as to be forcibly opened at a fast speed, and when a human being is near the PT door, an accident may occur.

SUMMARY OF THE INVENTION

Therefore, an aspect of the detailed description is to provide a distribution panel capable of minimizing a phenomenon in which a PT door is forcibly opened at a fast speed in case of an arc accident and minimizing an accident.

To achieve these and other advantages and in accordance with the purpose of this specification, as embodied and broadly described herein, a distribution panel includes an inner partition partitioning a front power transformer (PT) chamber and a rear cable chamber, wherein the inner partition includes: a partition body, on which a bushing is disposed in a penetrating manner, having openings allowing an arc to pass therethrough; and an inner cover rotatably coupled to the partition body to open and close the opening, and rotated by an arc pressure when an arc accident occurs in the front PT chamber, to open the opening.

The inner covers may be installed on a rear surface of the partition body such that the inner covers are rotated within the rear cable chamber.

The inner covers may be larger than the openings and a front side thereof may be in contact with the partition body.

The openings may be formed in plurality in the partition body, and the inner covers may be provided at the plurality of openings, respectively.

The openings may include an upper opening formed in a position higher than the bushing and a lower opening formed in a position lower than the bushing.

The inner covers may include an upper cover opening and closing the upper opening and a lower cover opening and closing the lower opening.

The upper opening may be smaller than the lower opening.

The upper cover and the lower cover may be installed to be rotated in mutually opposite directions.

The upper cover may have a horizontal hinge shaft provided in an upper portion of the partition body and may be rotated centered on an upper end portion thereof, and the lower cover may have a horizontal hinge shaft provided on a lower portion of the partition body and may be rotated centered on a lower end portion thereof.

The distribution panel may further include a lower cover holder fixing the lower cover in a position at which the lower cover closes the lower opening, and separated or broken when the lower cover is rotated by an arc pressure.

According to the present disclosure, when the inner covers opens the openings of the partition body by an arc from the front PT chamber, the arc from the front PT chamber may be spread to the rear cable chamber, lowering pressure of the front PT chamber, and a phenomenon in which the PT door is forcibly opened at a high speed is minimized, minimizing an accident.

Also, since the entire area of the opening allowing an arc to pass therethrough is maximized, the arc may be spread rapidly to the rear cable chamber and a possibility of an accident may be minimized.

In addition, interference and collision of the upper cover and the lower cove with the bushing are minimized to minimize damage to the bushing.

Moreover, interference and collision of the upper cover and the lower cover with a bus bar positioned in the rear cable chamber are minimized, minimizing damage to the bus bar.

Furthermore, since a closed state of the lower cover is maintained, reliability of the lower cover may be enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
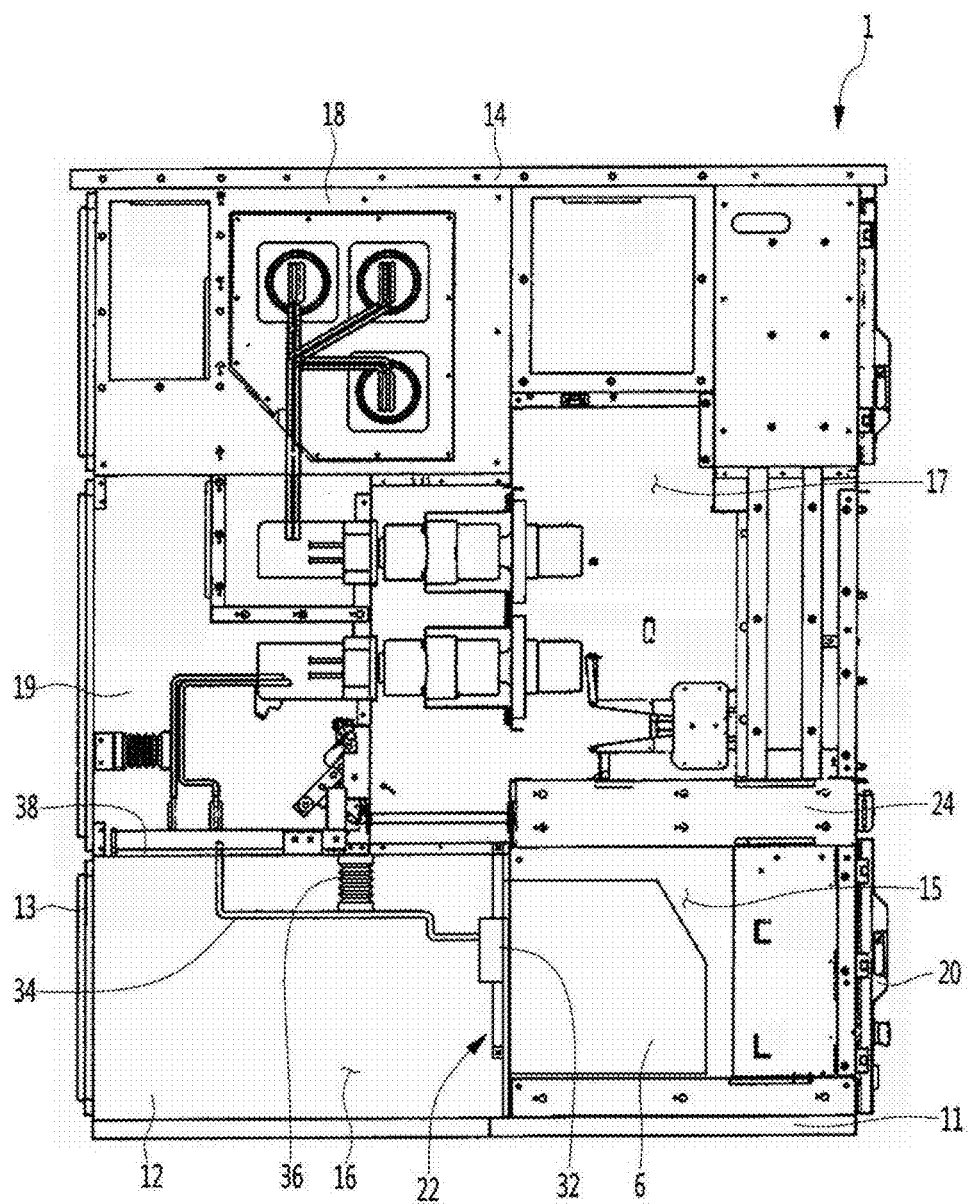
FIG. 1 is a side view illustrating an interior of a distribution panel according to an embodiment of the present disclosure.
Figure 2:
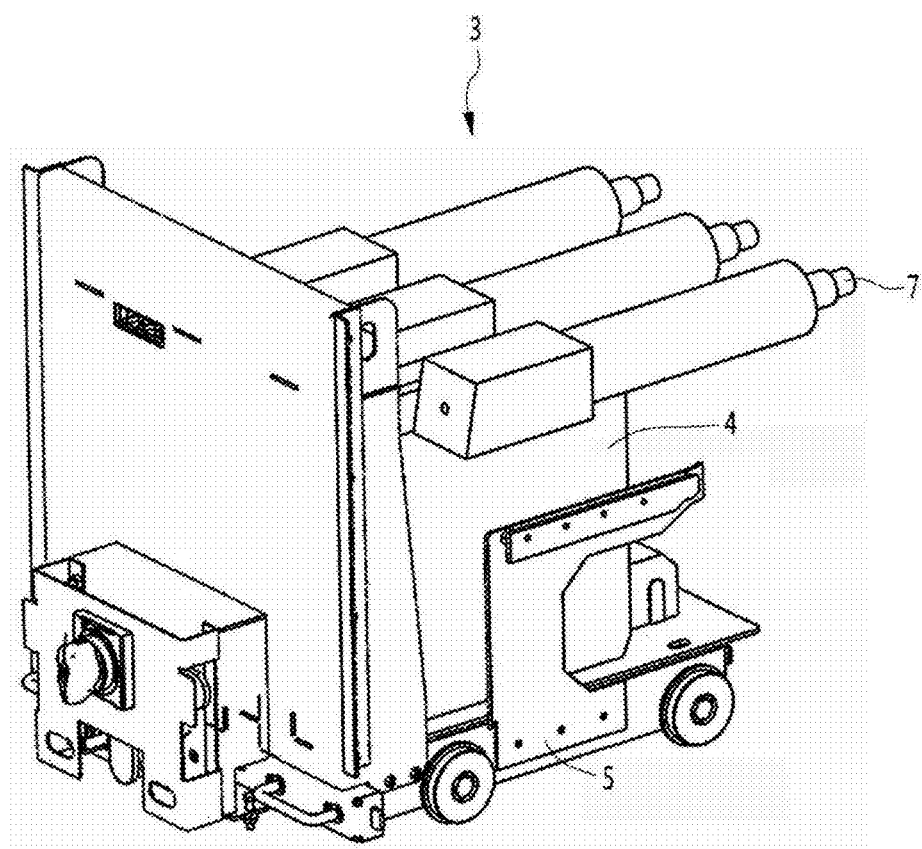
FIG. 2 is a perspective view illustrating a power transformer of a distribution panel according to an embodiment of the present disclosure.

FIG. 1 is a side view illustrating an interior of a distribution panel according to an embodiment of the present disclosure, and FIG. 2 is a perspective view illustrating a power transformer (PT) of a distribution panel according to an embodiment of the present disclosure.

The distribution panel may include a cabinet 1. The cabinet 1 may be a case forming an appearance of the distribution panel, and may be configured as an assembly of a plurality of members.

The cabinet 1 may have a space formed therein. A PT 3, a circuit breaker (CB), a cable, a bus bar 34, a bus, and the like, may be accommodated in the space of the cabinet 1. The cabinet 1 may have a shape with one side opened, and the PT 3 and the CB may be introduced through the opened one side of the cabinet 1.

The cabinet 1 may include a base 11, a side body and a rear body 13 disposed on the base 11, and a top body 14 disposed on the side body 12 and the rear body 13.

The side body 12 may be provided as a pair of left and right side bodies above the base 11, and the pair of side bodies 12 may form a side appearance of the distribution panel.

The base 11, the side body 12, and the rear body 13 may each be configured as an assembly of a plurality of members.

The distribution panel may be divided into a plurality of chambers. In the distribution panel, a front PT chamber 15 in which the PT 3 is disposed, a rear cable chamber 16 in which a cable or a bus bar 34 are accommodated, a front CB chamber 17 in which a CB (not shown) is disposed, and a bus chamber 18 in which a bus passes.

The front PT chamber 15, the rear cable chamber 16, the front CB chamber 17, and the bus chamber 18 may be partitioned and formed by at least one partition disposed within the cabinet 1.

A front side of the cabinet 1 may be open, and the open front side of the cabinet 11 may be opened and closed by at least one door 20.

A CB chamber door opening and closing the front CB chamber 17 may be installed in the cabinet 1. The CB chamber door may be installed to be rotatable around one of left and right sides in the cabinet 1 to open and close the front CB chamber 17.

A PT door 20 opening and closing the front PT chamber 15 may be installed in the cabinet 1. The PT door 20 may be installed to be rotatable around one of left and right sides in the cabinet 1 to open and close the front PT chamber 15.

The distribution panel may include an inner partition 22 disposed within the cabinet 1. The inner partition 22 may be configured as an assembly of a plurality of members. The inner partition 22 may be disposed to extend in a vertical direction within the cabinet 1. The inner partition 22 may partition between the rear body 13 as a rear plate part and the PT door 20. The inner partition 22 may partition an inner lower part of the cabinet 1 into the front PT chamber 15 and the rear cable chamber 16. A space between the inner partition 22 and the PT door 20 may become the front PT chamber 15, and the PT 3 illustrated in FIG. 2 may be received and disposed in the front PT chamber 15. A space between the inner partition 22 and the rear body 13 may become the rear cable chamber 16.

The distribution panel may further include a front partition 24 partitioning the front PT chamber 15 and the front CB chamber 17. The front partition 24 may be disposed to be perpendicular to the inner partition 22. The front partition 24 may be horizontally disposed within the distribution panel to vertically partition the front PT chamber 15 and the front CB chamber 17. The front partition 24 may be a lower body of a CB with respect to the front CB chamber 17, and may be an upper body of a PT with respect to the front PT chamber 15. An upper surface of the front partition 24 may form the CB chamber 17, and a lower surface thereof may form the front PT chamber 15.

The front PT chamber 15 may be formed between a lower surface of the front partition 24, a rear surface of the PT chamber door 20, an upper surface of the base 11, and a front surface of the inner partition 22.

The CB may be positioned above the front partition 24 and disposed in the front CB chamber 17.

The PT 3 may be positioned below the front partition 24 and disposed in the front PT chamber 15.

A bushing 32 may be disposed in a penetrating manner in the inner partition 23. The bushing 32 may have a hollow shape in which an interior thereof is open in a forward/backward direction, and a front portion of the bushing 32 may be positioned in the front PT chamber 15 and a rear portion of the bushing 32 may be positioned in the rear cable chamber 16.

The distribution panel may further include the bus bar 34 led in to an interior of the bushing 32 from a rear side of the bushing 32 installed in the inner partition 22 and upwardly bent at least one time.

As illustrated in FIG. 1, a PT cradle 6 on which the PT 3 is mounted may be installed in the distribution panel. The PT cradle 6 may be provided to be fixed in position in the front PT chamber 15.

As illustrated in FIG. 2, the PT 3 may include a PT body 4 and a carriage 5 allowing the PT body 4 to be mounted thereon and moving the PT body 4.

The PT 3 may have a terminal 7 inserted into the bushing 32 and connected to the bus bar 34. The terminal 7 may be installed to be positioned in a rear portion of the PT body 4, and when the PT 3 is moved to a lead-in position, the terminal 7 may be inserted into the bushing 32 so as to be connected to the bus bar 34.

Meanwhile, as illustrated in FIG. 1, the distribution panel may have a bus bar supporter 36 supporting the bus bar 34, and the bus bar supporter 36 may be installed on a rear partition 38 disposed within the distribution panel and support the bus bar 34.

The rear partition 38 may be disposed to be perpendicular to the inner partition 22. The rear partition 38 may be horizontally disposed within the distribution panel and vertically partition the rear cable chamber 16 and the upper cable chamber 19 positioned above the rear cable chamber 16.

The rear partition 38 may be a lower body of an upper cable chamber with respect to the upper cable chamber 19 and may be an upper body of a rear cable chamber with respect to the rear cable chamber 16. An upper surface of the rear partition 38 may form the upper cable chamber 19, and a lower surface thereof may form the rear cable chamber 16.

The bus bar supporter 36 may be installed such that an upper end thereof is fixed to the rear partition 38 and a lower end there of is connected to the bus bar 34 to support the bus bar 34.

Figure 3:
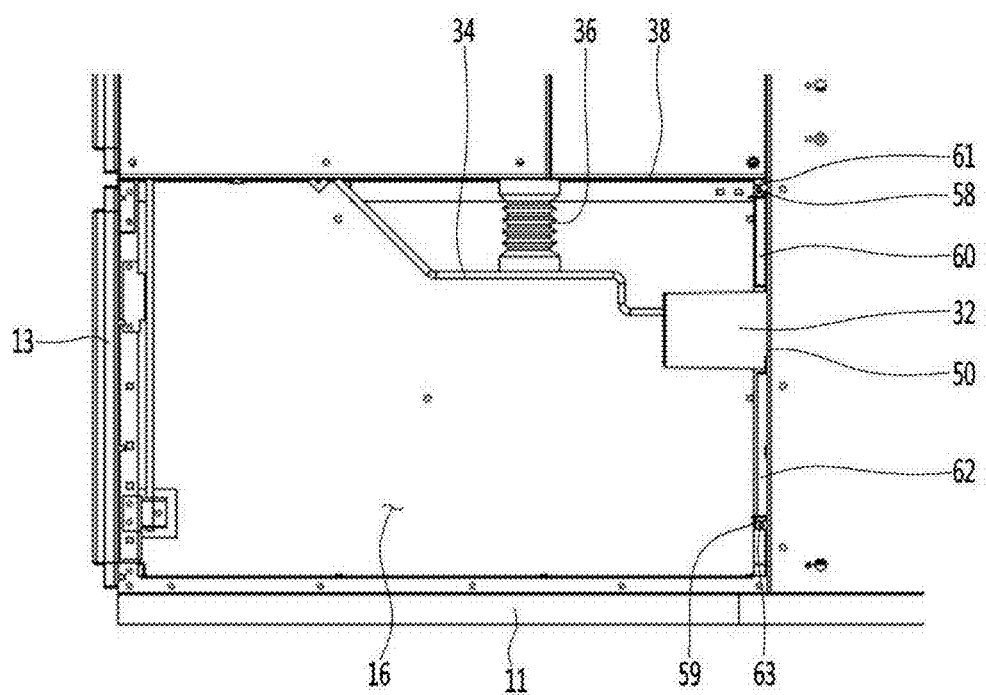
FIG. 3 is an enlarged side view of a rear cable chamber illustrated in FIG. 1.
Figure 4:
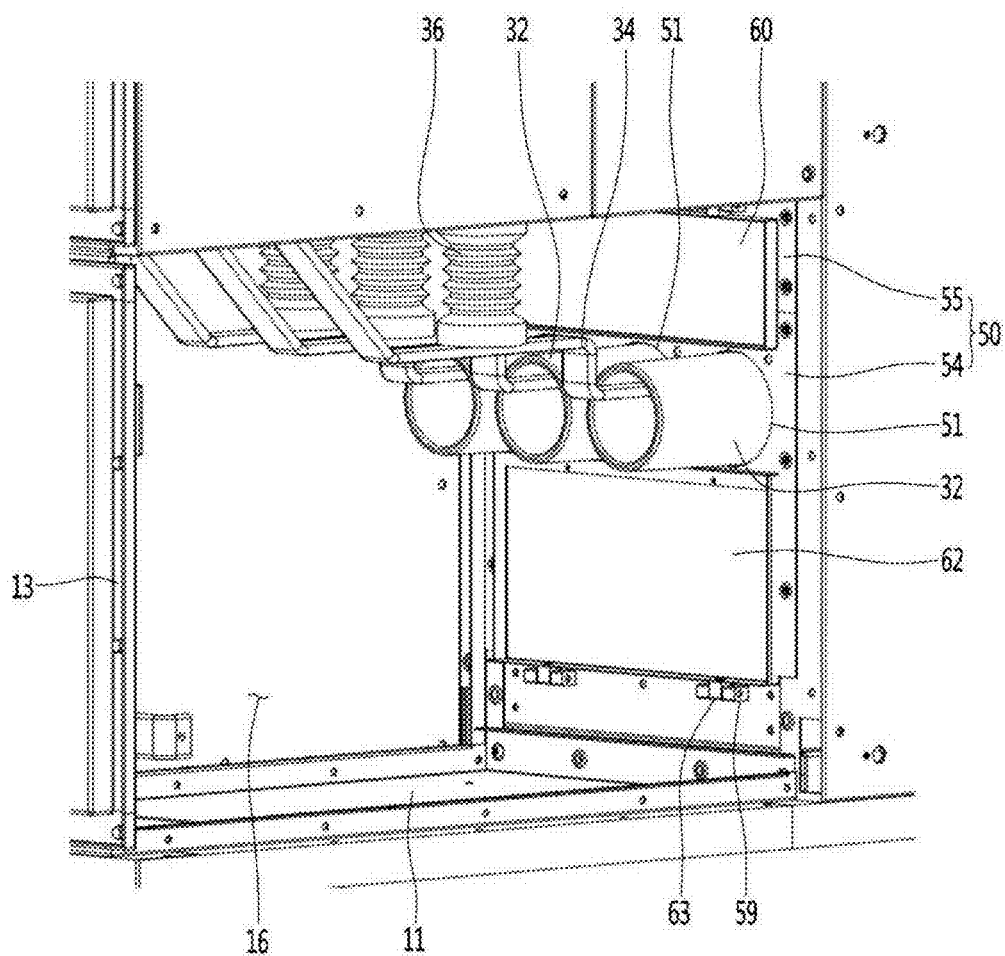
FIG. 4 is a perspective view illustrating a rear cable chamber illustrated in FIG. 1.
Figure 5:
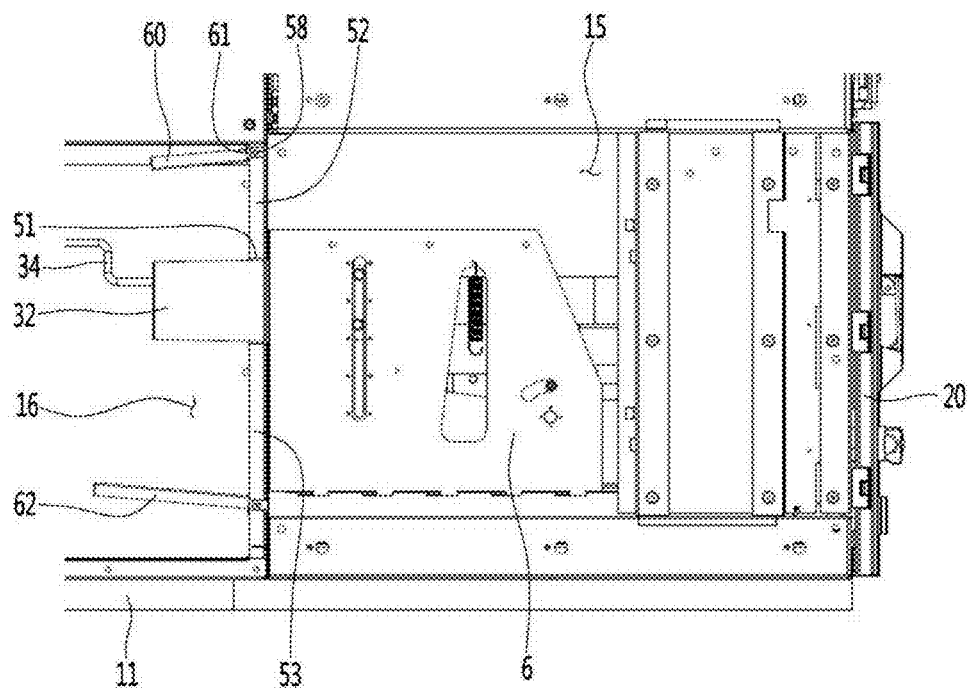
FIG. 5 is a side view illustrating a rear cable chamber and a front power transformer (PT) chamber of a distribution panel when an arc accident occurs in the front PT chamber according to an embodiment of the present disclosure.
Figure 6:
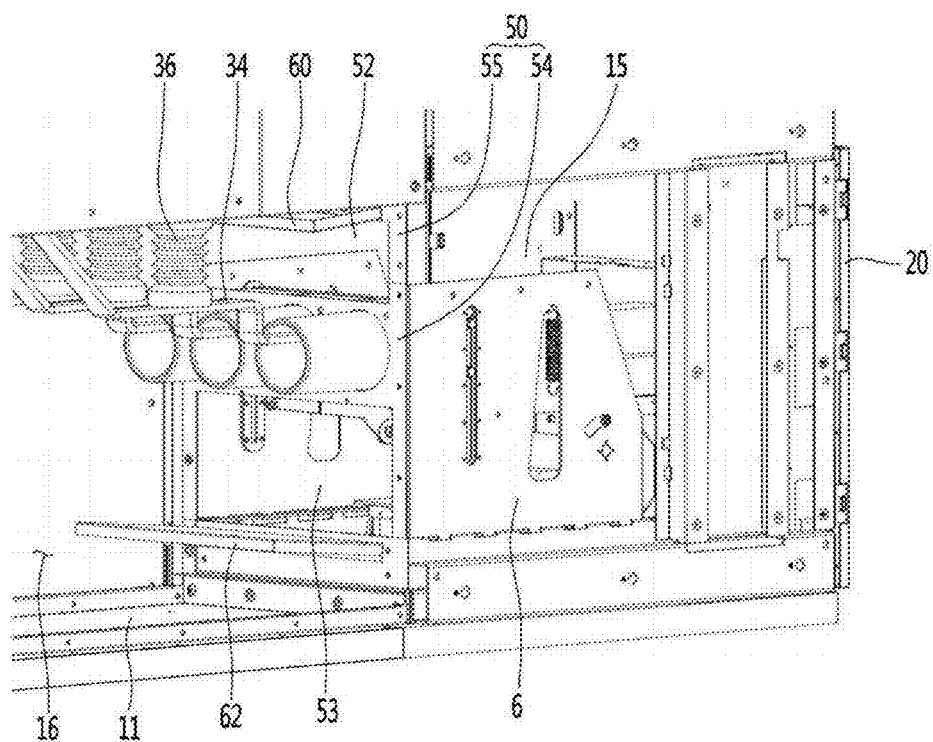
FIG. 6 is a perspective view illustrating a rear cable chamber and a front power transformer (PT) chamber of a distribution panel when an arc accident occurs in the front PT chamber according to an embodiment of the present disclosure.

FIG. 3 is an enlarged side view of a rear cable chamber illustrated in FIG. 1, FIG. 4 is a perspective view illustrating a rear cable chamber illustrated in FIG. 1, FIG. 5 is a side view illustrating a rear cable chamber and a front power transformer (PT) chamber of a distribution panel when an arc accident occurs in the front PT chamber according to an embodiment of the present disclosure, and FIG. 6 is a perspective view illustrating a rear cable chamber and a front power transformer (PT) chamber of a distribution panel when an arc accident occurs in the front PT chamber according to an embodiment of the present disclosure.

As illustrated in FIGS. 3 to 6, the inner partition 22 may include a partition body 50 and inner covers 60 and 62.

The partition body 50 may have a bushing through hole 51 allowing the bushing 32 to penetrate therethrough. The partition body 50 may have openings 52 and 53 allowing an arc to pass therethrough.

The partition body 50 may include a single member or a plurality of members vertically disposed within the distribution panel.

In a case in which the partition body 50 include a plurality of members, the partition body 50 may include a lower body 54 and an upper body 55 positioned above the lower body 54. In a case in which the partition body 50 includes a plurality of members, the partition body 50 may be easily assembled within the distribution panel.

The bushing through hole 51 may be provided in plurality in the partition body 50, and may be provided by the number corresponding to the number of the bushings 32 penetrating through the partition body 50.

The bushing through hole 51 may be formed in any one of the lower body or 54 the upper body 55, and a plurality of through holes 51 may be formed together in any one of the lower body 54 and the upper body 55.

When not blocked by the inner covers 60 and 62, respectively, the openings 52 and 53 may serve as communication holes allowing the front PT chamber 15 and the rear cable chamber 16 to communicate with each other or serves as arc passages allowing an arc from the front PT chamber 15 to move to the rear cable chamber 16.

Preferably, the openings 52 and 53 are formed to be as large as possible in the partition body 50. The openings 52 and 53 may be formed to be spaced apart from the bushing through hole 51 in consideration of a rotation angle of the inner covers 60 and 62. Preferably, the openings 52 and 53 are formed to be as large as possible in a region of the partition body 50, other than a region in which the bushing through hole 51 is formed.

The openings 52 and 53 may be formed in at least one of an upper region, lower region, left region, and right region of the region in which the bushing through hole 51 is formed. The openings 52 and 53 may be formed in plurality in the partition body 50. An arc generated in the front PT chamber 15 may be dispersed to the rear cable chamber 16 through the plurality of openings 52 and 53 formed in the partition body 50.

Preferably, the openings 52 and 53 are formed in upper and lower regions of the region in which the bushing through hole 51 is formed, in consideration of a rotation angle.

The region in which the bushing through hole 51 is formed may extend in a traverse direction in the partition body 50, and the openings 52 and 53 may be formed extendedly in a traverse direction in the region positioned above the region in which the bushing through hole 51 is formed and the region positioned below the region in which the bushing through hole 51 is formed.

The openings 52 and 53 may include an upper opening 52 higher than the bushing through hole 51 and a lower opening 53 lower than the bushing through hole 51.

Each of the upper opening 52 and the lower opening 53 may have a square shape or a rectangular shape. In a case in which the upper opening 52 and the lower opening 53 have a rectangular shape, the rectangular shape may be a shape in which a length thereof in a traverse direction is greater than a length thereof in a longitudinal direction.

The bushing through hole 51 may be positioned to be closer to an upper end of the rear cable chamber 16, among upper and lower ends of the rear cable chamber 16, in consideration of a height of a terminal of the PT 3, and in this case, the upper opening 52 may be smaller than the lower opening 53.

The upper opening 52 may be formed to be smaller than the lower opening 53 between the bushing through hole 51 and the upper end of the rear cable chamber 16, and the lower opening 53 may be formed to be greater than the upper opening 52 between the bushing through hole 51 and the lower end of the rear cable chamber 16.

The partition body 50 and the inner covers 60 and 62 may face the PT chamber door 20.

The inner covers 60 and 62 may be rotatably connected to the partition body 50 to open and close the openings 52 and 53, respectively. In case of an arc accident, the inner covers 60 and 62 may be rotated by arc pressure to open the openings 52 and 53.

The inner covers 60 and 62 may be installed to rotate toward the rear cable chamber 16 on a rear surface of the partition body 50.

The inner covers 60 and 62 may block the openings 52 and 53, respectively, in a state of being vertically positioned before an arc accident occurs in the front PT chamber 15.

When an arc accident occurs in the PT chamber 15, the inner covers 60 and 62 may be pushed by arc pressure applied from the front PT chamber 15 so as to be rotated slantingly or horizontally toward the rear cable chamber 16.

The inner covers 60 and 62 may be larger than the openings 52 and 53 and front sides thereof may be in contact with the partition body 50.

Horizontal hinge shafts 61 and 63 may be provided in the inner covers 60 and 62, respectively.

Hinge shaft support portions 58 and 59 rotatably supporting the horizontal hinge shafts 61 and 63 may be provided in the partition body 50.

The inner cover may be rotated center on a vertical hinge shaft, rather than a horizontal hinge shaft, in another embodiment. Preferably, the inner covers 60 and 62 are provided not to interfere with the bus bar 34 when rotated by an arc, while allowing the openings 52 and 53 to have a maximum size, and more preferably, the inner covers 60 and 62 may be rotated centered on the horizontal hinge shafts 61 and 63, respectively.

The inner covers 60 and 62 may be provided in the openings 52 and 53, respectively. In a case in which the two openings 52 and 53 are formed in the partition body 50, two inner covers 60 and 62 may be provide, and in a case in which three or more openings 52 and 53 are formed in the partition body, three or more inner covers 60 and 62 may be provided.

In the distribution panel, a single opening may be opened and closed dividedly by a plurality of inner covers.

The inner covers 60 and 62 may include an upper cover 60 opening and closing the upper opening 52 and a lower cover 62 spaced apart from the upper cover 60 and opening and closing the lower opening 53.

The upper cover 60 and the lower cover 62 may be connected to the partition 50 such that they rotate in mutually opposite directions.

Preferably, the upper cover 60 rotates in a direction which the upper cover 60 does not hit the bushing 32 and the bus bar 34, and the upper cover 60 positioned above the bushing 32 rotates centered on an upper end portion of the upper cover 60.

Preferably, the lower cover 62 rotates in a direction which the lower cover 62 does not hit the bushing 32 and the bus bar 34, and the lower cover 62 positioned below the bushing 32 rotates centered on a lower end portion of the lower cover 62.

The upper cover 60 may have the hinge shaft 61 in an upper portion thereof so as to be rotated centered on the upper portion. The partition body 50 may have an upper hinge shaft support portion 58 rotatably supporting the horizontal hinge shaft 61 of the upper cover 60 at an upper portion thereof.

The lower cover may have the hinge shaft 63 in a lower portion thereof so as to be rotated centered on the lower portion. The partition body 50 may have a lower hinge shaft support portion 59 rotatably supporting the horizontal hinge shaft 63 of the lower cover 62 at a lower portion thereof.

Figure 7:
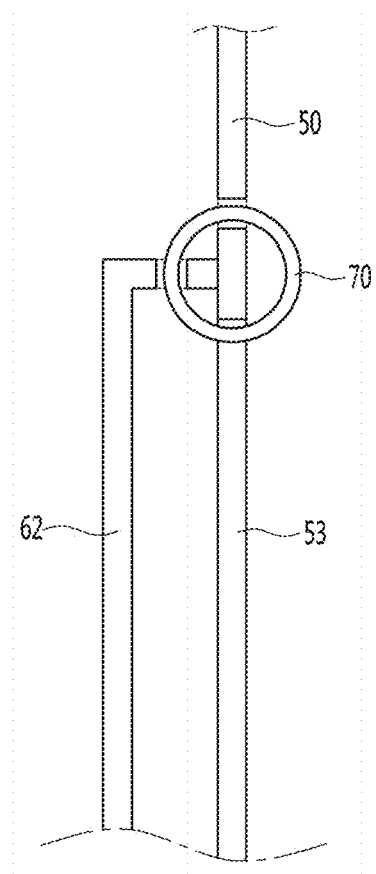
FIG. 7 is a cross-sectional view illustrating a state in which a lower cover of a distribution panel is fixed to a partition body according to an embodiment of the present disclosure.

FIG. 7 is a cross-sectional view illustrating a state in which a lower cover of a distribution panel is fixed to a partition body according to an embodiment of the present disclosure.

As illustrated in FIG. 7, the distribution panel may further include a lower cover holder 70 maintaining a position of the lower cover 62.

The lower cover holder 70 may fix the lower cover 62 to a position in which the lower cover 62 closes the lower opening 53.

The lower cover holder 70 may be separated by the lower cover 62 which rotates when the lower cover 62 is rotated by an arc pressure.

The lower cover holder 70 may tie the lower cover 62 6 to the partition body 60 and may be configured as a ring having one side which is broken or untied when an external force is applied to the lower cover 62 in a direction in which the lower cover 62 is open.

The lower cover holder 70 may be configured as a lower cover connection member having one end connected or attached to the partition body 50 and the other end connected or attached to the lower cover 62 to tightly attach the lower cover 62 to the partition.

In this case, when a strong external force is applied to the lower cover 62 in a direction in which the lower cover 62 is opened, one end of the lower cover holder 70 may be separated from the partition body 50, the other end of the lower cover holder 70 may be separated from the lower cover 62, or one end and the other end of the lower cover holder 70 may be disconnected.

Although not shown, the lower cover 62 may be insert-coupled to the partition body 50 through a recess and a protrusion.

Hereinafter, an operation of the distribution panel configured as described above according to the present disclosure will be described.

First, when an arc accident occurs in the PT 3, the arc may spread to the front PT chamber 15, and a pressure of the arc may act on the inner partition 22. A portion of the pressure of the arc acting on the inner partition 22 may act on the front sides of the inner covers 60 and 62 to push the inner covers 60 and 62 toward the rear cable chamber 16.

Due to the pressure of the arc, the inner covers 60 and 62 may be rotated to protrude toward the rear cable chamber 16, and at this time, the openings 52 and 53 of the partition body 50 may be opened.

When the openings 52 and 53 are opened, the front PT chamber 15 and the rear cable chamber 16 may communicate with each other through the openings 52 and 53, and the arc from the front PT chamber 15 may be spread to the rear cable chamber 16 through the openings 52 and 53.

When the arc is spread to the rear cable chamber 16, internal pressure of the front PT chamber 15 may be reduced compared with a case in which the arc is not spread to the rear cable chamber 16, and spreading of the arc to the rear cable chamber may minimize a phenomenon in which the PT chamber door 20 is forcibly opened at a high speed.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A distribution panel comprising:
   an inner partition partitioning a front power transformer (PT) chamber and a rear cable chamber,
   wherein the inner partition comprises:
   a partition body, on which a bushing is disposed in a penetrating manner, having openings allowing an arc to pass therethrough; and
   inner covers rotatably coupled to the partition body to open and close the openings, and rotated by an arc pressure when an arc accident occurs in the front PT chamber, to open the openings, wherein the openings include an upper opening formed in a position higher than the bushing and a lower opening formed in a position lower than the bushing, wherein the inner covers include an upper cover opening and closing the upper opening and a lower cover opening and closing the lower opening, wherein the upper cover has a horizontal hinge shaft provided in an upper portion of the partition body and is rotated centered on an upper end portion thereof, and wherein the lower cover has a horizontal hinge shaft provided on a lower portion of the partition body and is rotated centered on a lower end portion thereof; and a lower cover holder fixing the lower cover in a position at which the lower cover closes the lower opening, and separated or broken when the lower cover is rotated by an arc pressure.

2. The distribution panel of claim 1, wherein the inner covers are installed on a rear surface of the partition body such that the inner covers are rotated within the rear cable chamber.

3. The distribution panel of claim 1, wherein the inner covers are larger than the openings and a front side thereof is in contact with the partition body.

4. The distribution panel of claim 1, wherein the openings are formed in plurality in the partition body, and the inner covers are provided at the plurality of openings, respectively.

5. The distribution panel of claim 1, wherein the upper opening is smaller than the lower opening.

6. The distribution panel of claim 1, wherein the upper cover and the lower cover are installed to be rotated in mutually opposite directions.

* * * * *